(No Model.)

H. MASON.
Feed Water Heater.

No. 237,299. Patented Feb. 1, 1881.

(No Model.) 2 Sheets—Sheet 2.

H. MASON.
Feed Water Heater.

No. 237,299. Patented Feb. 1, 1881.

Witnesses:
Albert H. Adams
B. A. Price

Inventor:
Henry Mason
By West & Bond
His Attys

UNITED STATES PATENT OFFICE.

HENRY MASON, OF CHICAGO, ILLINOIS.

FEED-WATER HEATER.

SPECIFICATION forming part of Letters Patent No. 237,299, dated February 1, 1881.

Application filed September 20, 1880. (No model.)

*To all whom it may concern:*

Be it known that I, HENRY MASON, residing at Chicago, in the county of Cook and State of Illinois, and a citizen of the United States, have invented new and useful Improvements in Condensing Steam and Heating and Purifying Feed-Water for Steam-Boilers—i. e., Feed-Water Heaters—of which the following is a full description, reference being had to the accompanying drawings, in which—

Figure 1:
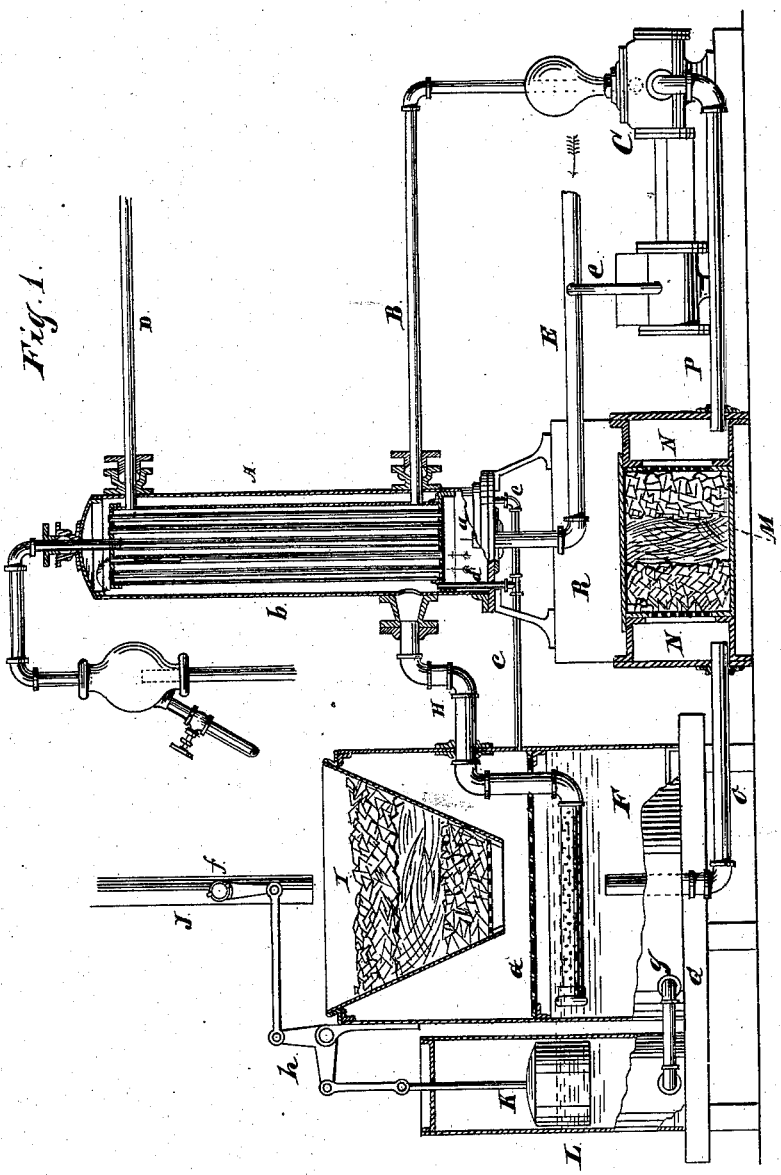
Figure 2:
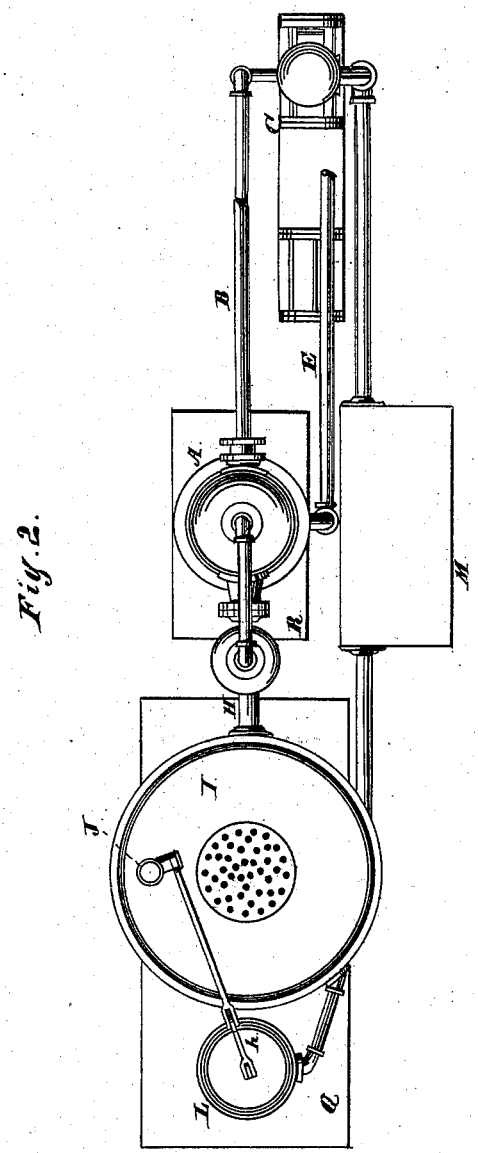

Figure 1 is an elevation, some parts being in section; Fig. 2, a plan.

The objects of my invention are to provide cheap and effective means for condensing the exhaust-steam from steam-engines and returning the same, with the feed-water, to the boilers; and to provide means for purifying, to a great degree, the feed-water required, in addition to the condensed steam. The first object I accomplish by discharging the exhaust-steam into a tank or vessel which is supplied with feed-water, and the second by means of filters, all as hereinafter fully described.

In the drawings, A represents a feed-water heater constructed substantially in the usual manner, having a chamber, a, at the bottom, into which the exhaust-steam from the engine is conducted, water-spaces, tubes for the passage of steam, and an outer chamber, b, into which steam passes from the tubes.

c is a tube leading from the chamber a, and d is a tube leading from the steam-chamber b to the tube c, which discharges into the tank F.

B is the pipe through which feed-water is conveyed into the heater from the pump C, and D is the tube through which feed-water is conveyed from the heater to the boiler.

E is the pipe through which the exhaust-steam from the engine is conducted to the heater A. This pipe E is carried into the chamber a to a point a little above the bottom.

e is pipe through which the exhaust-steam from the pump-cylinder passes into the pipe E.

F is a tank. G is a perforated plate in this tank, located above the water-line, for scattering the water.

H is a pipe leading from the steam-chamber b in the heater A to the tank F. The end of this pipe H, which is within the tank, is below the water-line. The extreme end is preferably closed, and suitable perforations are provided in that part of the pipe which is below the water-line, as shown in the drawings.

I is a receptacle or filter within or above the tank, filled with any suitable filtering material.

J is a pipe through which the feed-water flows into the receptacle or filter I.

f is a valve in the pipe J, to regulate the flow of water. This valve is automatically adjusted by means of a float, K, in a water-chamber, L, suitable connections, h, between the valve and float being provided.

g is a connecting-pipe between the tank F and water-chamber L.

M is a filter having a space, N, for water on each side of the filtering material. This filter has a close cover.

O is a pipe leading from the tank F to the filter M, and P is a pipe leading from this filter to the pump C.

I have not shown a steam-boiler. The parts which I have described may be located, relatively to the boiler and to each other, as may be most convenient. As shown, F and L stand on a platform, Q. This is not essential. The heater A also stands on a platform, R.

In use, so much of the steam as is not condensed in the heater A passes into the feed-water tank F through the tube H, entering the water in such tank below the water-line, and is there condensed. The condensation in the heater passes from the chamber a through the pipe c, and from the chamber b through the tube d into c, which discharges into the tank F. The tank F is supplied with feed-water from any suitable source through the pipe J, which discharges into the filter I. The flow of water from the pipe J to the tank is regulated by the valve f, which is automatically operated by the float K, which rises and falls with the water in the tank F, which is connected with the chamber L by a suitable tube, g. Water flows from the tank F through the tube O into the filter M, from which it is drawn by the pump C and forced into the heater A, from which it passes to the boiler through a tube, D.

By carrying the exhaust-steam into a water-receptacle and condensing the same there I obtain such a quantity of pure water as is contained in the stream, and utilize the heat of the steam in heating the cold feed-water in the tank. I also save and convey to the tank F the water formed by condensation in the heater. Thus much of the water supplied to the boilers is distilled water. There is a saving of fuel, by utilizing the heat of the steam, for heating the cold feed-water in the tank F. The heat from the steam will be sufficient to raise the water in the tank to the boiling-point. If the heat is more than sufficient for this purpose, I place a second heater, A, between the engine and the feed-water tank, providing heaters of such size that the heat of the steam conveyed to the tank F will be but little more than sufficient to raise the water in the tank to the boiling-point. By thus boiling the feed-water the lime and some other impurities which are held in solution in the cold feed-water will be separated therefrom, and will be mostly arrested by the filter M.

Of course the exhaust-steam could be conveyed direct from the engine to the tank F; but there would then be great loss of heat. It is therefore best to use one or more heaters, A.

The end of the pipe H in the tank F should be but little below the water-line.

That portion of the feed-water which is supplied through the tube J passes through two filters, I and M, on its way to the boiler, which filters retain a large percentage of the impurities.

What I claim as new, and desire to secure by Letters Patent, is as follows:

1. A feed-water tank, F, in combination with a pipe, H, to conduct exhaust-steam into the water in such tank, and a pipe, O, leading from such tank, for supplying feed-water to the boiler, all constructed and operating substantially as and for the purposes specified.

2. A feed-water tank, F, in combination with a pipe, H, for discharging steam into the tank, a filter, I, a filter, M, and pipes O and P, substantially as specified.

3. The combination of a feed-water tank, F, a pipe so arranged as to conduct exhaust-steam to this tank F, and a feed-water tube, J, provided with a valve, $f$, automatically operated by means of a float, K, substantially as and for the purposes specified.

HENRY MASON.

Witnesses:
E. A. WEST,
O. W. BOND.